United States Patent
Chu et al.

(10) Patent No.: US 9,998,911 B2
(45) Date of Patent: Jun. 12, 2018

(54) TRANSFERRING INFORMATION TO A MOBILE DEVICE

(71) Applicant: Razer (Asia-Pacific) Pte. Ltd., Singapore (SG)

(72) Inventors: Brian Chu, San Mateo, CA (US); Justin Quan, San Francisco, CA (US); Michael A. Chan, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 105 days.

(21) Appl. No.: 14/835,981

(22) Filed: Aug. 26, 2015

(65) Prior Publication Data
US 2015/0365817 A1 Dec. 17, 2015

Related U.S. Application Data

(63) Continuation-in-part of application No. 14/043,034, filed on Oct. 1, 2013, which is a continuation-in-part of application No. 13/772,163, filed on Feb. 20, 2013, now Pat. No. 9,106,721.

(60) Provisional application No. 61/708,794, filed on Oct. 2, 2012.

(51) Int. Cl.
| | | |
|---|---|---|
| H04B 7/00 | (2006.01) | |
| H04W 8/18 | (2009.01) | |
| H04W 4/00 | (2018.01) | |
| H04L 29/08 | (2006.01) | |

(52) U.S. Cl.
CPC ......... *H04W 8/183* (2013.01); *H04L 67/1095* (2013.01); *H04W 4/001* (2013.01); *H04W 4/003* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 8,352,323 B2 * | 1/2013 | Fisher | ................... | G06Q 20/20 455/406 |
| 8,478,816 B2 * | 7/2013 | Parks | ................... | G06F 9/4856 709/203 |
| 8,606,948 B2 * | 12/2013 | Evans | ................... | G06F 9/4443 709/230 |

(Continued)

*Primary Examiner* — Tuan A Tran
(74) *Attorney, Agent, or Firm* — Mattingly & Malur, PC

(57) ABSTRACT

In some examples, a first mobile device is placed into communication with a second mobile device, such as through a short-range radio connection. User information is transferred from the first mobile device to the second mobile device. For example, application information for an application and saved application state information may be transferred to the second mobile device. The second mobile device may configure the application on the second mobile device based in part on the application state information received from the first mobile device. In addition, a user communication ID may be transferred from the first mobile device to the second mobile device, and may be used for communication with a third device with which the first mobile device has previously communicated. For instance, the user communication ID may be used in place of a device communication ID when sending communications from the second mobile device.

19 Claims, 9 Drawing Sheets

(56) References Cited

U.S. PATENT DOCUMENTS

| | | | | |
|---|---|---|---|---|
| 8,812,601 | B2 * | 8/2014 | Hsieh | G06F 9/4856 709/206 |
| 9,485,648 | B2 * | 11/2016 | Rong | H04W 8/183 |
| 9,520,918 | B2 * | 12/2016 | Adrangi | H04B 5/00 |
| 2012/0110568 | A1 * | 5/2012 | Abel | G06F 8/61 717/178 |

* cited by examiner

TRANSFERRING INFORMATION TO A MOBILE DEVICE

CROSS-REFERENCES TO RELATED APPLICATIONS

This application is a continuation-in-part of U.S. patent application Ser. No. 14/043,034, entitled "APPLICATION STATE BACKUP AND RESTORATION ACROSS MULTIPLE DEVICES", which was filed on Oct. 1, 2013, which is a continuation-in-part of U.S. patent application Ser. No. 13/772,163, entitled "APPLICATION STATE SYNCHRONIZATION ACROSS MULTIPLE DEVICES", filed on Feb. 20, 2013, which claims the benefit of U.S. Provisional Patent Application No. 61/708,794, entitled "CLOUD COMPUTING INTEGRATED OPERATING SYSTEM", which was filed on Oct. 2, 2012, all of which applications are incorporated by reference herein.

BACKGROUND

People use mobile electronic devices for communication, entertainment, work, navigation, accessing the Internet, and a variety of other functions. However, these mobile devices typically have limited lifespans, e.g., of one or two years, before being replaced with newer models. Often, when a person replaces an older mobile device with a newer mobile device, the person has to manually reload, reenter and/or reauthenticate user information such as Wi-Fi connections, BLUETOOTH® pairings, user applications, application settings, device settings, access permissions, passwords, and so forth.

SUMMARY

Some implementations herein include techniques and arrangements for transferring information from a first mobile device to a second mobile device. For instance, the first mobile device may be placed into communication with a second mobile device, such as through a short-range radio connection, e.g., BLUETOOTH®, Wi-Fi, or the like. User information may be transferred from the first mobile device to the second mobile device. For example, application information for an application and saved application state information may be transferred to the second mobile device. The second mobile device may configure the application on the second mobile device based on the application state information received from the first mobile device.

In addition, a user communication ID may be transferred from the first mobile device to the second mobile device, and may be used for communication with a third device with which the first mobile device has previously communicated. For instance, the user communication ID may be used in place of a device communication ID, such as a MAC address or BLUETOOTH® address, when sending communications from the second mobile device to the third device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
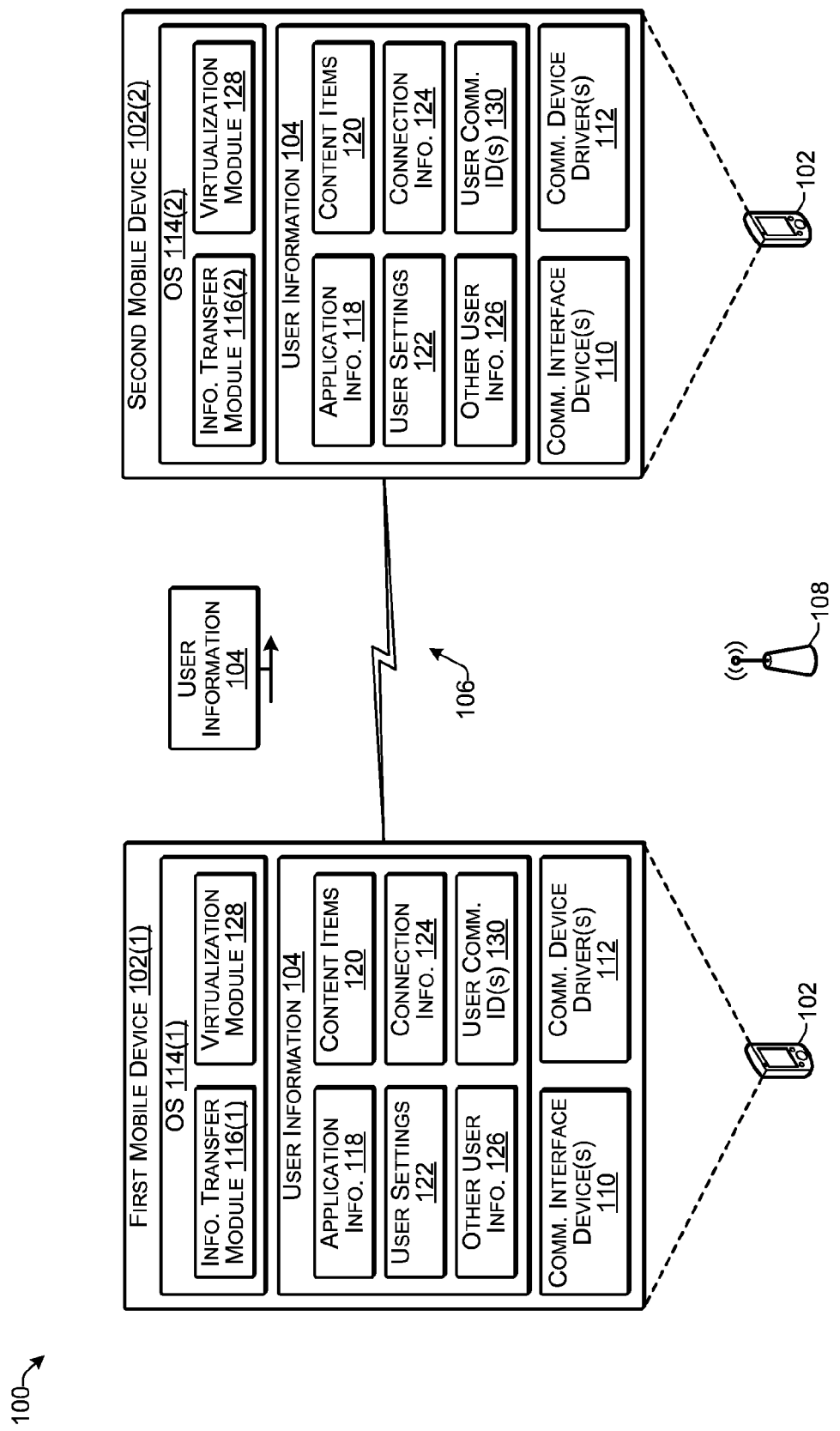
FIG. 1 illustrates an example system for transferring information between mobile devices according to some implementations.

Some examples herein include techniques and arrangements for transferring user information from a first mobile device to a second mobile device. For instance, the mobile devices may be smart phones, cellular phones, or other types of mobile communications devices, portable or wearable computing devices, tablet computing devices, or any other type of mobile computing device. As one example, the first mobile device may be a device that the user is retiring so that the user can begin using the second mobile device instead of the first mobile device. In some cases, the first mobile device may communicate directly with the second mobile device for transferring user information to enable a seamless transition from the first mobile device to the second mobile device. For instance, the first mobile device may transfer applications, content items, profiles, settings, prior connections, pairings, and other information to the second mobile device.

Additionally, or alternatively, to transfer the user information to the second mobile device, the first mobile device may communicate with a service computing device, such as for backing up some or all of the user information. The second mobile device may also communicate with the service computing device for receiving information transferred from the first mobile device to the service computing device. As still another alternative, the first mobile device may communicate with the second mobile device, and may further retrieve previously stored information from the service computing device. The first mobile device may transfer the retrieved information to the second mobile device along with the other user information that the first mobile device transfers to the second mobile device.

In addition, in some examples the mobile devices may each be configured with a virtual layer that enables virtualization of media access control (MAC) addresses, BLUETOOTH® addresses and/or other device communication identifiers (IDs). For instance, a user MAC address may be associated with a user account, rather than a physical communication interface device, and the user MAC address may be transferred with the user information from a first mobile device to a second mobile device. As one example, a physical communication interface device, such as a Wi-Fi transceiver or BLUETOOTH® transceiver, may typically have a device communication ID assigned to the communication interface device (i.e., a MAC address in the case of a Wi-Fi transceiver and a BLUETOOTH® (BT) address in the case of a BLUETOOTH® transceiver). However, in implementations herein, the operating system (OS) of the mobile device may employ a virtual user MAC address in place of the device MAC address and/or a virtual user BT address in place of the device BT address for at least some of the communication interface devices. Accordingly, the applications installed on the mobile device may communicate with the virtual layer rather than the communication interface devices and may use the user communication IDs rather than the device communication IDs.

The OS of the mobile device may intercept every system call to the communication interface devices and may replace the user communication ID with the device communication ID for incoming communications, and replace the device communication ID with the user communication ID for outgoing communications. For instance, the kernel of the OS may be configured to use the user communication IDs in place of the device communication IDs for the communication interface devices onboard the mobile device. The kernel may interact with the respective driver for a respective communication interface device and the driver may be modified to use the user communication ID rather than the device communication ID. As one example, when the user changes mobile devices, the virtual user BT address is transferred along with other BLUETOOTH® connection information, so that the previous pairings with other BLUETOOTH® devices remain intact. In some examples, if a different user logs on to the mobile device, the OS may change the user communication IDs used in the virtual layer to those of the different user, such as by accessing the respective drivers of the communication interface devices to cause the drivers to start using the different user communication IDs associated with the different user that has logged in.

In the implementations in which the first mobile device communicates directly with the second mobile device for transferring user information, the first mobile device and the second mobile device may be paired to be in short-range radio communication and/or may be able to communicate over a local area network (LAN) such as by being in communication through the same wireless access point. As still another example, the first mobile device may be directly connected to the second mobile device, such as through a wired connection. After communication is established between the first mobile device and the second mobile device, the first mobile device may begin transferring user information from the first mobile device to the second mobile device.

In some examples, after the transfer of user information from the first mobile device to the second mobile device is complete (e.g., synchronous transfer), the second mobile device can send a message to the first mobile device indicating that the transfer of user information is complete. In response, the first mobile device can remove or otherwise deprovision the use of the user communication IDs in the virtual layer information and other user-specific information and settings. Alternatively, in the case of the user information being transferred from a service computing device (i.e., asynchronous transfer) to the second mobile device, a checking service provided by the service computing device may send an instruction for the virtual layer information to cease to be used or otherwise be deprovisioned by the first mobile device.

In some examples, following transfer of user information from a first mobile device to a second mobile device, the applications transferred from the first mobile device to the second mobile device may be restored to their prior states. For instance, the OS on the first mobile device may be configured to store the state of each application each time the application is accessed on the first mobile device. Thus, for each application that is used on the first mobile device, the OS may take a snapshot of the application when the user stops using the application to obtain the most up-to-date state information. The OS may store this state information on the first mobile device or with other backup information at the service computing device. The stored state information for each application may be transferred to the second mobile device with the application information and used to configure the state of each application installed on the second mobile device.

For discussion purposes, some example implementations are described in the environment of transferring user information from a first mobile device to a second mobile device. However, implementations herein are not limited to the particular examples provided, and may be extended to other types of devices, other system configurations, other types of information, other communication techniques, and so forth, as will be apparent to those of skill in the art in light of the disclosure herein.

FIG. 1 illustrates an example system 100 for transferring information between mobile devices according to some implementations. In this example, a first mobile device 102(1) may communicate directly with a second mobile device 102(2). The first mobile device 102(1) may transfer user information 104 to the second mobile device 102(2) to enable a seamless user transition from the first mobile device 102(1) to the second mobile device 102(2). As one example, a user may cause the first mobile device 102(1) to transfer the user information 104 to the second mobile device 102(2) such as in the case that the user recently acquired the second mobile device 102(2) and would like to begin using the second mobile device 102(2) in place of the first mobile device 102(1), such as when the user purchases a new cellphone to replace an older model. However, the examples herein are not limited to this particular situation, and may be used for other applications, as will be apparent to those of skill in the art having the benefit of the disclosure herein.

In the example of FIG. 1, to transfer the user information 104, the first mobile device 102(1) may communicate directly with the second mobile device 102(2) over a communication connection 106. For instance, the first mobile device 102(1) and the second mobile device 102(2) may be paired to be in direct short-range radio communication with each other, or may be able to communicate over a local area network (LAN) such as by being in communication through the same wireless router or other wireless access point 108. Accordingly, the first mobile device 102(1) may communicate directly with the second mobile device 102(2) through a short-range radio connection such as a BLUETOOTH® connection, a Wi-Fi connection, or other wireless transmission channel as the communication connection 106. For instance, in the case of a BLUETOOTH® connection, the first mobile device 102(1) may be paired with the second mobile device 102(2) to enable direct transfer of the user information 104 over a wireless transmission channel. As another example, in the case of a Wi-Fi connection, the first mobile device 102(1) may be configured to communicate with the second mobile device 102(2) through a direct wireless radio connection, or through a radio connection to the same wireless access point 108, which may serve as an intermediary in the communication connection 106. As still another example, the first mobile device 102(1) may be directly connected to the second mobile device 102(1), such as through a wired connection, e.g., a USB (universal serial bus) connection, Ethernet connection, or other suitable connection technology.

Accordingly, each mobile device 102 may include one or more communication interface devices 110, such as a Wi-Fi transceiver chip, a BLUETOOTH® transceiver chip, a USB port, an Ethernet port, or the like, to enable direct communication between the two mobile devices 102(1) and 102(2). Furthermore, each mobile device 102 may include a respective communication device driver 112 for each communication interface device 110 operated on the respective mobile device 102. After communication is established between the first mobile device 102(1) and the second mobile device 102(2) via the communication connection 106, the first mobile device 102(1) may begin transferring information from the first mobile device 102(1) to the second mobile device 102(2).

An operating system (OS) 114(1) on the first mobile device 102(1) may include a first information transfer module 116(1) that communicates with a second information transfer module 116(2) of an OS 114(2) on the second mobile device 102(2). The first information transfer module 116(1) may communicate with the second information transfer module 116(2) following the establishment of the communication connection 106 between the first mobile device 102(1) and the second mobile device 102(2). The first information transfer module 116(1) may determine the user information 104 to be transferred to the second mobile device 102(2) and may begin sending the user information 104 over the communication connection 106 to the second information transfer module 116(2) on the second mobile device 102(2). The second information transfer module 116(2) and/or the OS 114(2) may manage or otherwise control the installation of the user information 104 on the second mobile device 102(2). When transfer of the user information 104 to the second mobile device 102(2) is complete, the second information transfer module 116(2) may send a message to the first information transfer module 116(1) indicating that the transfer of the user information 104 is complete.

The first mobile device 102(1) may transfer user information 104 such as application information 118, which may include each application that the user has installed on the first mobile device 102(1), as well as application data for each application and application state information saved by the first mobile device 102(1) for each application. For example, the OS 114(1) on the first mobile device 102(1) may be configured to store the state of each application each time the application is accessed on the first mobile device 102(1). Thus, for each application that is used on the first mobile device 102(1), the OS 114(1) may take a snapshot of the application when the user stops using the application to obtain the most up-to-date state information. For each application on the first mobile device 102(1), the application state information may be saved incrementally as changes are made during use of the respective application. The OS 114(1) may store this state information on the first mobile device 102(1). In other examples, as discussed below with respect to FIGS. 2 and 3, the OS 114 may backup this application state information to a service computing device (not shown in FIG. 1) with other backup information sent to the service computing device. For instance, the saved application state information may be backed up to the service computing device on a daily basis, such as overnight when the first mobile device 102 is otherwise in a standby mode. Subsequently, when transferring the user information 104 from the first mobile device 102(1) to the second mobile device 102(2), the stored application state information for each application may be transferred to the second mobile device 102(2) with the application information 118 and may be used to restore or otherwise configure the states of the respective applications on the second mobile device 102(2).

The content of the application state information stored for each application depends at least in part on the particular application that is being executed. Some examples of application state information may include values for various variables used by the application, values for most recent application settings and graphic user interface configurations, values for recently received user inputs or other user selections, and so forth. Thus, the state of the application may include the stored information to which the application has access at a point in time, essentially creating a snapshot of the application at the point in time.

In addition, in some cases, the application information 118 that is transferred may include the original application installation file, such as an APK file in the case of ANDROID® OS variants, an IPA file in the case of IOS® OS variants, or an XAP file in the case of WINDOWS® Phone OS variants. Following transfer of the user information 104 from the first mobile device 102(1) to the second mobile device 102(2), the transferred applications may be installed on the second mobile device 102(2) and restored to their prior states using the stored state information for each respective application. In some examples, one or more of the transferred applications may be uninstalled from the first mobile device 102(1), such as in the case that the user only has a license to use the particular application on a single device. Thus, according to some implementations, the user does not need to download or reinstall any applications on the second mobile device 102(2). Instead, the applications may be installed by the OS 114(2) and the states may be restored for each application based on the transferred backed up application state information. Additional application information 118 transferred to the second mobile device 102(2) may include the order in which the applications were originally installed on the first mobile devices 102(1) and user account information or login information associated with the respective applications.

In some cases, during or following installation of the respective applications, the OS 114(2) may reauthenticate the respective applications to the application provider service, such as for enabling update notices, digital rights management controls, and the like. For example, for an application that uses a username and password, the OS 114(2) may receive these credentials with the connection information 124, and/or the application information 118, and/or, e.g., in the case of a password, from a credential management location. In some examples, the OS 114(2) may provide these services via one or more application programming interfaces (APIs). Consequently, following transfer of the application information 118 and reinstallation of the applications on to the second mobile device 102(2), when the user opens a respective application on the second mobile device 102(2), the application may function and appear the same as if the user were to open the application on the first mobile device 102(1) prior to the transfer.

Other types of user information 104 that may be transferred to the second mobile device 102(2) may include digital content items 120, such as photographs, images, videos, movies, books, documents, music, and so forth; user settings 122, such as wallpaper settings, icon locations, user controlled OS settings, user profiles, device configuration information, and the like; connection information 124, such as radio pairing information for a plurality of prior radio pairings with other devices, such as BLUETOOTH® pairings, Wi-Fi connection information for a plurality of prior Wi-Fi connections, as well as permissions, passwords, website login information, application login information, and so forth; and other user information 126, which may include numerous other types of user information not mentioned above.

In addition, in some examples the mobile devices 102 may each include a virtualization module 128. The virtualization module 128 may be an OS module executable on the mobile device 102 to configure a virtual layer. The virtual layer may enable virtualization of media access control (MAC) addresses, BLUETOOTH® addresses and/or other communication interface device IDs for the respective communication interface devices 110. For example, the virtual layer may insert user communication IDs 130, such as a user-associated MAC address, a user-associated BLUETOOTH® (BT) address, or the like, that may be transferred with the user information 104 from the first mobile device 102(1) to the second mobile device 102(2). The user communication IDs 130 may be associated with a user account, rather than physical communication interface devices 110. Thus, the user communication IDs 130 are not tied to any particular device, and therefore may be transferred with the user information 104 from mobile device to mobile device.

As discussed additionally below with respect to FIG. 4, a physical communication interface device 110, such as a short-range radio transceiver, e.g., a Wi-Fi transceiver chip, BLUETOOTH® transceiver chip, or other short-range radio transceiver, may typically have a unique or otherwise individually distinguishable device communication ID assigned to the particular communication interface device 110. However, in implementations herein, the virtualization module 128 of the mobile device 102 may employ the user communication IDs 130, such as a virtual user MAC addresses in place of the device MAC address, a virtual user BT address in place of the device BT address, or other virtual user communication IDs in place of the device IDs for at least some of the communication interface devices 110. Accordingly, the applications installed on the mobile device 102 may communicate with the virtual layer rather than the communication interface devices 110 and may use the user communication IDs 130 in place of the device communication IDs.

Use of the user communication IDs 130 enables transfer of the user communication IDs 130 with the user information 104. Accordingly, this enables seamless transfer of BLUETOOTH® pairings, Wi-Fi connections, and so forth, because the user BT address and the user Wi-Fi MAC address remain the same on the second mobile device 102(2) as on the first mobile device 102(1). For example, the user communication IDs 130 may be associated with a user account rather than the communication interface devices 110 on the first mobile device 102(1). Accordingly, as the user moves from the first mobile device 102(1) to the second mobile device 102(2), the OS 114(2) adds a virtual layer between the physical communication interface devices 110 and the OS applications or user applications. The virtual layer may intercept communications and interject the user communication ID 130 for a particular communication interface device 110, rather than the actual communication interface device ID. Thus, an application using a particular communication interface device 110 uses the virtual user communication ID 130, rather than the actual communication interface device ID.

In some examples, the one or more user communication IDs 130 that are used in the virtual layer between the communication interface device 110 and the applications may be based on which user is currently logged in to the mobile device 102. For instance, if a different user logs in, then that user's communication IDs 130 may be used by the virtual layer. Furthermore, following the transfer of the user information 104, including the user communication IDs 130, from the first mobile device 102(1) to the second mobile device 102(2), the first mobile device 102(1) may deprovision itself from using the user communication IDs 130 by removing the virtual layer information. This action can remove the risk of conflicts with the second mobile device 102(2). For instance, after the transfer of the user information 104 from the first mobile device 102(1) to the second mobile device 102(2) is complete, the information transfer module 116(2) on the second mobile device 102(2) may send a message or other indication to the first mobile device 102(1) indicating that the transfer is complete. In response, the information transfer module 116(1) on the first mobile device 102(1) may cease to use, or otherwise deprovision the virtual layer information including the user communication IDs 130 and other user-specific information and settings.

Figure 2:
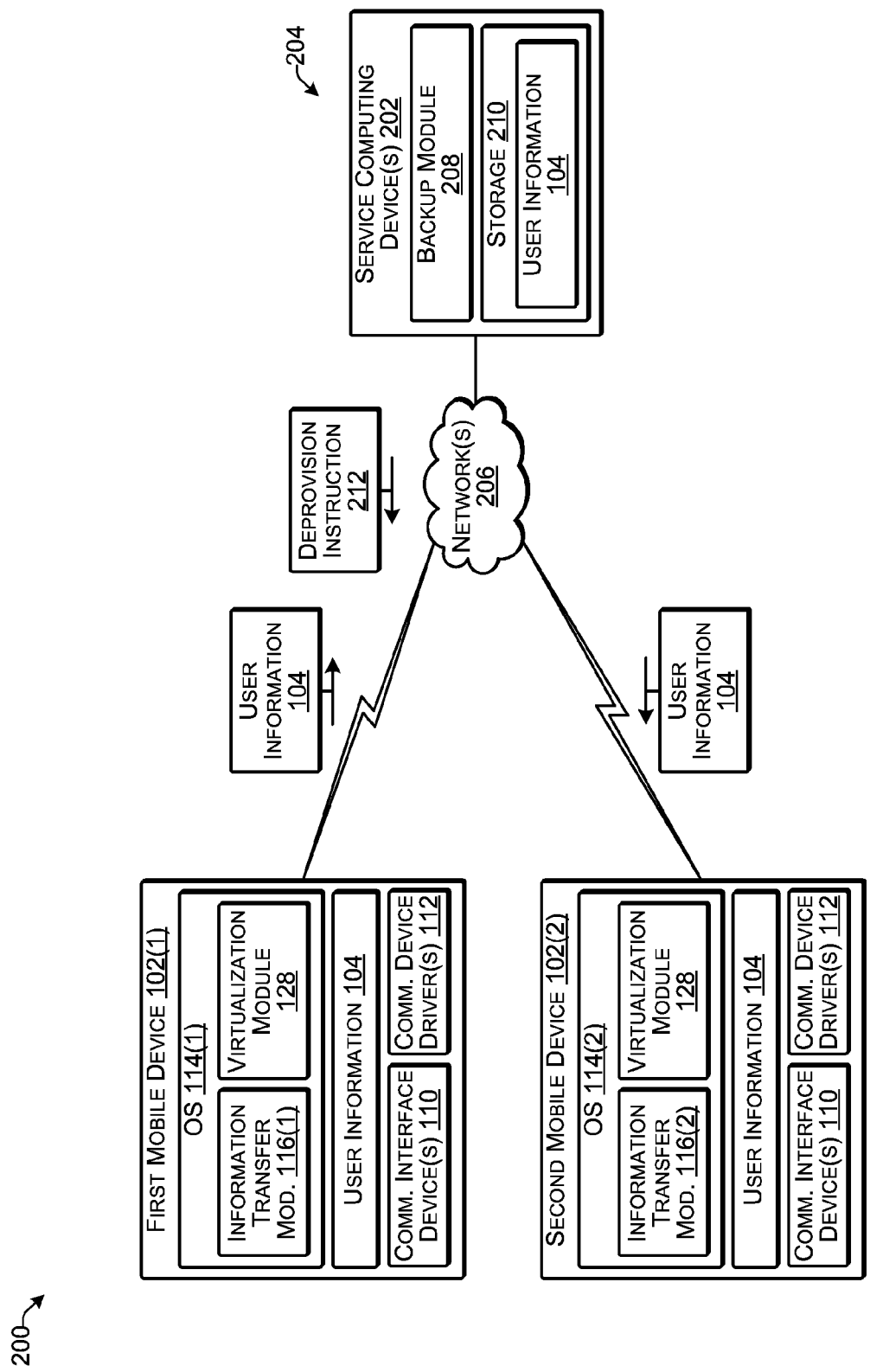
FIG. 2 illustrates an example system for transferring information between mobile devices according to some implementations.

FIG. 2 illustrates an example system 200 for transferring information between mobile devices according to some implementations. In this example, the system 200 includes one or more service computing devices 202 of a service provider 204 that may receive, over one or more networks 206, the user information 104 from the first mobile device 102(1). For instance, as discussed above, the OS 114(1) on the first mobile device 102(1) may periodically backup the user information 104 to the service computing device 202. The service computing device 202 may include a backup module 208 that receives the user information 104 from the first mobile device 102(1) and stores the first user information 104 in a storage 210 associated with the service computing device 202.

In some examples, the OS 114(1) on the first mobile device 102(1) may be configured to store the respective state of a respective application each time the respective application is accessed on the first mobile device 102(1). Thus, for each application that is used on the first mobile device 102(1), the OS 114(1) may take a snapshot of the application when the user stops using the application to obtain the most up-to-date state information. The application state information may be saved incrementally as changes are made during use of the respective application. The OS 114(1) may backup this application state information to the service computing device 202 with other user information 104 sent to the service computing device 202. For instance, the saved application state information and any other changes to the user information 104 may be backed up to the service computing device 202 on a daily basis, such as overnight or when the first mobile device 102(1) is otherwise in a standby mode and connected to the one or more networks 206. Subsequently, when transferring the user information 104 to the second mobile device 102(2), the stored state information for each application may be transferred to the second mobile device 102(2) with the user information 104 and may be used to restore or otherwise configure the states of the respective applications on the second mobile device 102(2).

In the illustrated example, the service computing device 202 of the service provider 204 is able to communicate with the mobile devices 102 over the one or more networks 206. The one or more networks 206 can include any appropriate network, including a wide area network, such as the Internet; a local area network, such an intranet; a wireless network, such as a cellular network; a local wireless network, such as Wi-Fi; short-range wireless communications, such as BLU-ETOOTH®; a wired network, including fiber optics and Ethernet; any combination thereof, or any other suitable communication network or communication connection. Components used for such communication technologies can depend at least in part upon the type of network, the environment selected, or both. Protocols for communicating over such networks are well known and will not be discussed herein in detail. Accordingly, the service computing device 202 is able to communicate over the one or more networks 206 with the first mobile device 102(1) and the second mobile device 102(2) using wired or wireless connections, and combinations thereof.

As mentioned above, the first mobile device 102(1) may periodically update the user information 104 stored by the service computing device 202. When a user desires to transfer the user information 104 to the second mobile device 102(2), rather than placing the second mobile device 102(2) into communication with the first mobile device 102(1), the user may place the second mobile device 102(2) into communication with the service computing device 202. For example, the user may provide user account login information, or the like, for accessing the user information 104 in the storage 210. Accordingly, in this example, the transfer of the user information 104 to the second mobile device 102(2) may occur asynchronously of the transfer of the user information 104 from the first mobile device 102(1) to the service computing device 202. For instance, the first mobile device 102(1) may or may not be in communication with the service computing device 202 while the user information 104 is being transferred to the second mobile device 102(2).

As one example, the backup module 208 on the service computing device 202 may send the user information 104 from the service computing device 202 to the second mobile device 102(2). The user information 104 may include all of the user information 104 discussed above with respect to FIG. 1, such as the application information 118, content items 120, user settings 122, connection information 124, other user information 126, and the user communication IDs 130, which are not shown in FIG. 2 for clarity of illustration. Furthermore, when transfer of the user information 104 from the service computing device 202 to the second mobile device 102(2) is complete, the information transfer module 116(2) may send a message or other indication to the backup module 208 to inform the backup module 208 that the transfer of the user information 104 is complete.

In addition, in the case that the first mobile device 102(1) and the second mobile device 102(2) include instances of the virtualization module 128 for using virtual user communication IDs 130, the service computing device 202 may perform a function for deprovisioning the virtual layer information from the first mobile device 102(1). As one example, a checking service provided by the backup module 208 of the service computing device 202 may send a deprovisioning instruction 212 for the virtual layer information (e.g., the user communication IDs) and/or other user information 104 to no longer be used by the first mobile device 102(1). For instance, following receipt of the message from the second mobile device 102(2) indicating that transfer of the user information 104 is complete, the backup module 208 may send a deprovisioning instruction 212 to the first mobile device 102(1) to instruct the first mobile device 102(1) stop using or otherwise deprovision user communication IDs and other user-specific information. As an example, in the case that the first mobile device 102(1) is offline when the user information 104 is transferred to the second mobile device 102(2) (i.e., asynchronous transfer) from the service computing device 202, when the first mobile device 102(1) subsequently reconnects to the service computing device 202 over the one or more networks 206, the backup module 208 on the service computing device 202 may send the deprovisioning instruction 212 to the first mobile device 102(1) for instructing the first mobile device 102(1)to deprovision some or all of the user information 104 from the first mobile device 102.

Figure 3:
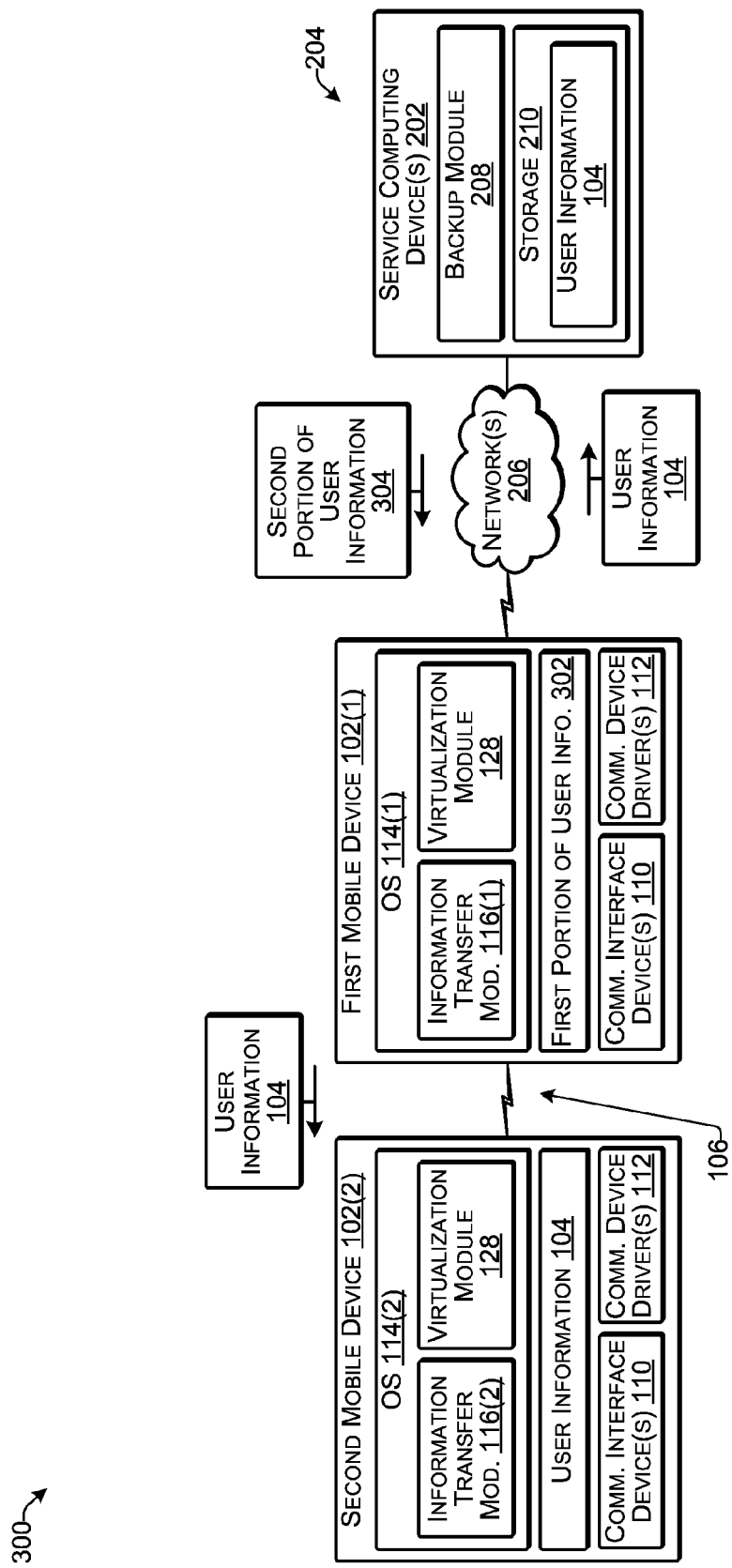
FIG. 3 illustrates an example system for transferring information between mobile devices according to some implementations.

FIG. 3 illustrates an example system 300 for transferring information between mobile devices according to some implementations. In this example, the system 300 includes the one or more service computing devices 202 that may receive, over the one or more networks 206, the user information 104 from the first mobile device 102(1). For instance, as discussed above, the OS 114(1) on the first mobile device 102(1) may periodically backup the user information 104 to the service computing device 202. The service computing device 202 may include the backup module 208 that receives the user information 104 from the first mobile device 102(1) and stores the first user information 104 in the storage 210 associated with the service computing device 202.

In this example, only a first portion 302 of user information is maintained on the first mobile device 102(1). For instance, the first mobile device 102(1) may be connected directly to the second mobile device 102(2) by the communication connection 106 discussed above with respect to FIG. 1. Further, the first mobile device 102(1) may also be in communication with the service computing device 202 via the one or more networks 206. The service computing device may store at least a second portion 304 of the user information, and in some examples, may store a complete back up of all the user information 104. During transfer of the user information 104 to the second mobile device 102(2), the first mobile device 102(1) may transfer the user information 104 to the second mobile device 102(2) by transferring the first portion 302 that is stored on the first mobile device 102(1). Further, first mobile device 102(1) may obtain the second portion 304 of the user information from the service computing device 202, and may also transfer the second portion 304 of the user information to the second mobile device 102(2). For example, the second portion 304 may be user information that is unlikely to be used on the first mobile device 102(1), such as the original application installation files and other such backed up data.

Following transfer of the user information 104 from the first mobile device 102(1) to the second mobile device 102(2), the transferred applications may be installed and restored or otherwise configured on the second mobile device 102(2) based on their prior saved states. Further, the example of FIG. 3 enables synchronous transfer of the user information 104. Accordingly, after the transfer of the user information 104 from the first mobile device 102(1) to the second mobile device 102(2) is complete, the information transfer module 116(2) on the second mobile device 102(2) may send a message to the first mobile device 102(1) indicating that the transfer is complete. In response, the information transfer module 116(1) on the first mobile device 102(1) may remove or otherwise deprovision the use of the virtual layer information including the user communication IDs 130 and other user-specific information and settings.

In addition, some examples herein may combine the examples of FIG. 2 and FIG. 3. For instance, instead of the first mobile device 102(1) obtaining the second portion 304 of user information from the service computing device 202, the second mobile device 102(2) may obtain the second portion 304 of the user information directly from the service computing device 202. This implementation may be useful, such as in the situation in which the first mobile device 102(1) does not have sufficient storage capacity to receive the second portion 304 of user information. Furthermore, while several examples have been described herein, numerous other variations will be apparent to those of skill in the art having the benefit of the disclosure herein.

Figure 4:
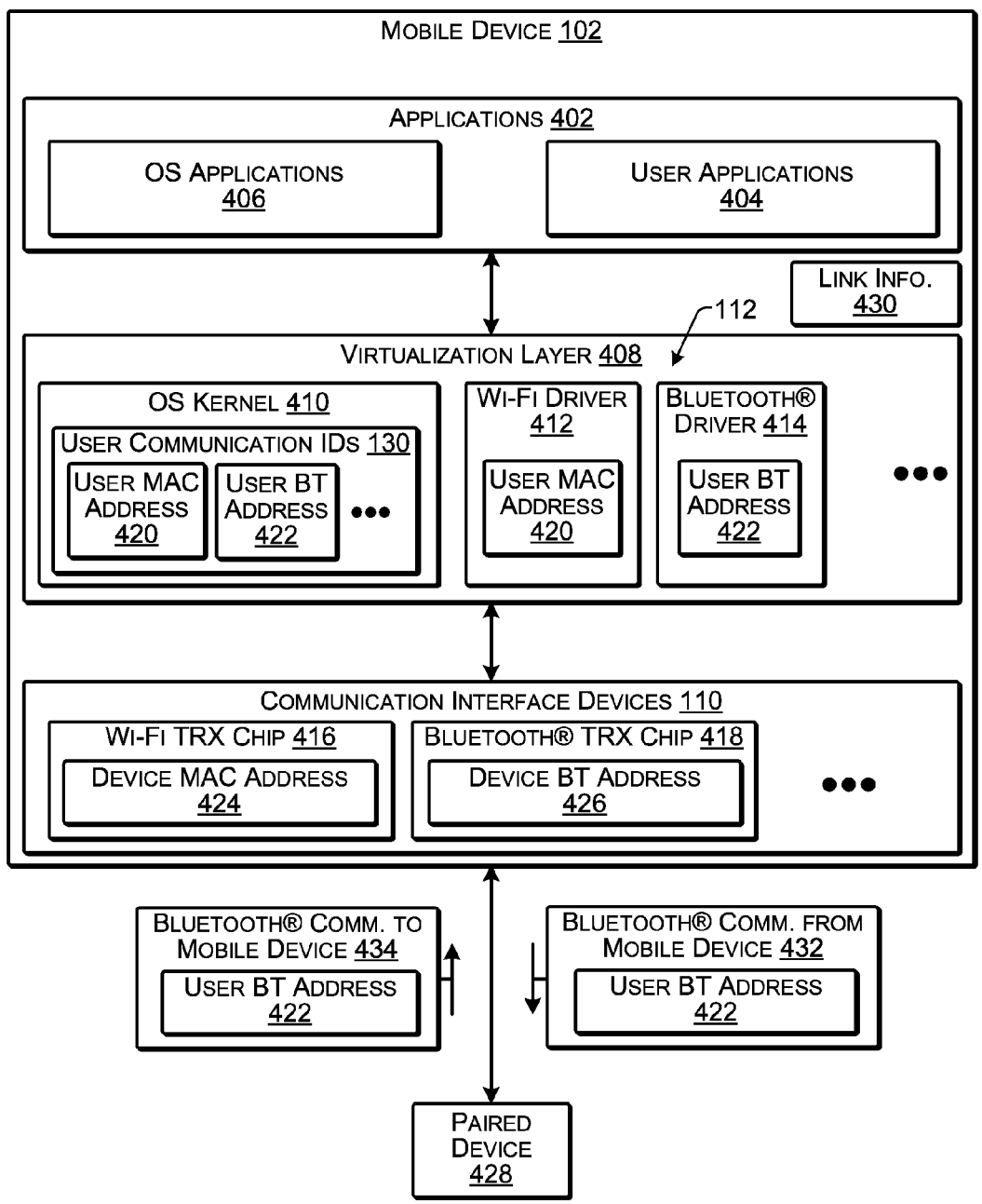
FIG. 4 is a block diagram illustrating a mobile device configuration according to some implementations.

FIG. 4 is a conceptual block diagram 400 illustrating the use of a virtualization layer on the mobile devices 102 according to some implementations. In this example, the mobile device 102 includes applications 402 such as user applications 404 and/or OS applications 406. For instance, the user applications 404 may have been downloaded or otherwise installed by the user on the mobile device 102 while the OS applications 406 may have been provided with the OS installed on the mobile device 102. The mobile device 102 further includes a virtualization layer 408, which in this example includes an OS kernel 410 of the OS installed on the mobile device 102, as well as communication device drivers 112, such as a Wi-Fi driver 412, and a BLUETOOTH® driver 414.

The mobile device 102 further includes the communication interface devices 110, which in this example include a Wi-Fi transceiver chip 416 and a BLUETOOTH® transceiver chip 418. For instance, the Wi-Fi transceiver chip 416 may be configured to transmit communications according to the Institute of Electrical and Electronics Engineers (IEEE) 802.11 protocol, while the BLUETOOTH® transceiver chip 418 may be configured to transmit communications according to the BLUETOOTH® protocol such as BLUETOOTH® v4.x. Furthermore, while two types of short-range radio communication devices are illustrated in this example other types of short-range radio communication devices and/or other types of communication interface devices may be used in other examples.

BLUETOOTH® is a wireless technology standard for exchanging data over short distances using short-wavelength UHF radio waves in the ISM band from 2.4 to 2.485 GHz. BLUETOOTH® technology is managed by the BLUETOOTH® Special Interest Group, which has member companies in the areas of telecommunication, computing, networking, and consumer electronics. Every BLUETOOTH® communication device, such as a BLUETOOTH® transceiver, has a unique or otherwise individually distinguishable 48-bit device BLUETOOTH® (BT) address that is assigned to that communication device by IEEE. The BLUETOOTH® address may be presented in the form of a 12-digit hexadecimal value. The most-significant half (24 bits) of the address may be an organization-unique identifier, such as to identify the device manufacturer, while the second 24-bits are the more unique part of the address to individually distinguish the particular communication interface device from other communication interface devices.

If two BLUETOOTH® communication interface devices have no prior connection, one of the devices may run an inquiry to try to discover the other. One communication interface device sends out the inquiry request, and any device listening for such a request will respond with its device BT address, and possibly its name and other information. To maintain security specific devices are recognized, thus enabling control over which devices are permitted to connect to a given BLUETOOTH® device. At the same time, it is useful for BLUETOOTH® communication devices to be able to establish a connection without user intervention (for example, as soon as in range). To resolve this conflict, BLUETOOTH® uses a process called bonding, and a bond is generated through a process called pairing. Pairing often involves some level of user interaction. This user interaction confirms the identity of the devices.

When pairing successfully completes, a bond forms between the two devices, enabling those two devices to connect to each other in the future without the user having to repeat the pairing process to confirm device identities. During pairing, the two devices establish a relationship by creating a shared secret known as link information. If both devices store the same BLUETOOTH® link information, they are said to be paired or bonded. A device that wants to communicate only with a bonded device can cryptographically authenticate the identity of the other device, ensuring that the device is the same device that it was previously paired with. Once link information is generated, an authenticated Asynchronous Connection-Less (ACL) link between the devices may be encrypted to protect exchanged data against eavesdropping. BLUETOOTH® devices generally require pairing before allowing another device to connect. However, implementations herein enable transfer of the link information with the user information 104, along with the user-associated BLUETOOTH® address. Thus, implementations herein avoid the need for repeating the pairing process when the second mobile device 102(2) establishes a connection with another BLUETOOTH® device with which the first mobile device 102(1) was previously paired.

Wi-Fi technology includes communication interface devices using IEEE 802.11 standards. Wi-Fi is a local area wireless computer networking technology that allows electronic devices to network, mainly using the 2.4 gigahertz UHF and 5 gigahertz SHF ISM radio bands. A MAC address is a unique identifier assigned to network communication interface devices for communications on a physical network segment. MAC addresses are used as a network address for most IEEE 802 network technologies, including Ethernet and Wi-Fi. Logically, the MAC address is used in the media access control protocol sublayer of the OSI reference model.

Wi-Fi and BLUETOOTH® to some extent may be complementary in their applications and usage. Wi-Fi is often access-point-centered, with traffic routed through an access point, while BLUETOOTH® is often symmetrical between two BLUETOOTH® devices. However, BLUETOOTH® access points are also possible and Wi-Fi ad-hoc connections are also possible.

As mentioned above, in some examples the mobile devices 102 may each be configured with the virtualization layer 408 that enables virtualization of media access control (MAC) addresses, BT addresses, and/or other communication device IDs. For instance, one or more user communication IDs 130, such as a user MAC address 420 and a user BT address 422 may be used in place of corresponding communication interface device IDs, such as a device MAC address 424 and a device BT address 426, respectively. The user MAC address 420, the user BT address 422, and/or other user communication IDs 130 may be associated with a user account of the user of the mobile device 102. For instance, the service provider may obtain a block of MAC addresses and a block of BT addresses from the IEEE, the entity that distributes MAC addresses and BT addresses, and the service provider may assign these addresses to users, rather than to physical communication interface devices.

The user communication IDs 130 may be transferred with the user information from the first mobile device to the second mobile device, as discussed above. As one example, a physical communication interface device 110, such as the Wi-Fi transceiver chip 416 or the BLUETOOTH® transceiver chip 418, may typically have a device communication ID assigned to the physical device, i.e., the device MAC address 424 and device BT address 426, respectively. However, in implementations herein, the OS of the mobile device may employ the virtual user communication IDs 130 in place of the device communication IDs for at least some of the physical communication interface devices 110. Accordingly, the applications 402 may communicate with the virtualization layer 408 rather than the communication interface devices 110 and may use the user communication IDs 130 rather than the device communication IDs (i.e., the device MAC address 424 or the device BT address 426).

The OS of the mobile device 102 may intercept the system calls to the communication interface devices 110 and replace the respective user communication ID with the device communication ID for incoming communications, and replace the device communication ID with the respective user communication ID for outgoing communications. Additionally, or alternatively, the kernel 410 of the OS may be configured to use the user communication IDs 130 in place of the device communication IDs for the communication interface devices 110 onboard the mobile device. The kernel 410 may interact with the respective driver 112 for a respective communication interface device 110 and may modify the driver 112 to use the user communication ID rather than the device communication ID.

In addition, prior to transfer of the user information to the second mobile device, the drivers 112 of the second mobile device may initially use the device communication IDs from the communication interface devices onboard the second mobile device 102(2) and may then be subsequently modified to use the respective user communication IDs 130 after the user information 104 has been transferred. For example, when the second mobile device is brand new (e.g., just out of the box), the drivers 112 can use the device communication IDs initially before the virtualization layer 408 is set up by the OS of the mobile device 102. Subsequently, when the virtualization layer 408 is set up on the mobile device 102, the OS may replace the device communication IDs with the user communication IDs 130 associated with the user account set up on the mobile device 102.

As one example, when transferring user information from a first mobile device to a second mobile device, as discussed above with respect to FIGS. 1-3, the drivers 112 on the second mobile device are able to operate and communicate with the first mobile device or the service computing device using the device communication IDs for respective communication interface devices, such as the device MAC address 424 or the device BT address 426. After the transfer of user information from the first mobile device to the second mobile device is complete, the virtual layer 408 with the user communication IDs may be initialized on the second mobile device and the virtualization layer 408 may be deprovisioned from the first mobile device. The OS on the second mobile device may set the user MAC address 420 in the Wi-Fi driver 412, the user BT address 422 in the BLUETOOTH® driver. Further, the OS kernel 410 may also be configured to use the user communication IDs 130 associated with the particular user, in place of the device communication IDs associated with the physical communication interface devices 110 onboard the second mobile device. Thus, the drivers 112 subsequently operate for sending communications using the user communication IDs 130 instead of the device communication IDs. This operation may take place following transfer of the user information 104, but before any applications are opened on the second mobile device, so there is no confusion or other conflicts between the applications on the second mobile device regarding the addresses of the communication interface devices 110. As an example, for the WI-FI transceiver chip 416, the user MAC address 420 might be set in the Wi-Fi driver, while for the BLUETOOTH® transceiver chip 418, the user BT address might be set in the OS kernel as well as the BLUETOOTH® driver 414.

The first time that a user opens a user account with the service provider, the service provider may assign particular user communication IDs 130 to the user account for various communication interface devices, such as a user MAC address 420 for use with Wi-Fi communications and a user BT address 422 for use with BLUETOOTH® communications. Thus, the first mobile device that the user sets up communicates with the service computing device of the service provider to establish the virtual layer. Subsequently, mobile-device-to-mobile-device setup and/or server-to-mobile-device setup is available for the next mobile device that the user sets with the user information.

In the example of FIG. 4, suppose that the mobile device 102 is the second mobile device 102(2) discussed above with respect to FIGS. 1-3, and further suppose that the first mobile device has previously been paired to have a BLUETOOTH® connection with a paired device 428. Consequently, the mobile device 102(2) may automatically connect to the paired device 428 without the user having to repeat the pairing process with the paired device 428. For example, based at least in part on the user BT address 422 and link information 430 (e.g., a shared secret between the first mobile device and the paired device 428) that was transferred from the first mobile device 102(1) with the user information 104, the second mobile device 102(2) may be able automatically connect to the paired device 428. For instance, a BLUETOOTH® communication 432 from the mobile device 102 may use the user BT address 422. Similarly, a BLUETOOTH® communication 434 to the mobile device may also use the user BT address 422. Wi-Fi connections may be similarly resumed on the second mobile device 102(2) without requiring the user to reconnect to prior connections.

Figure 5:
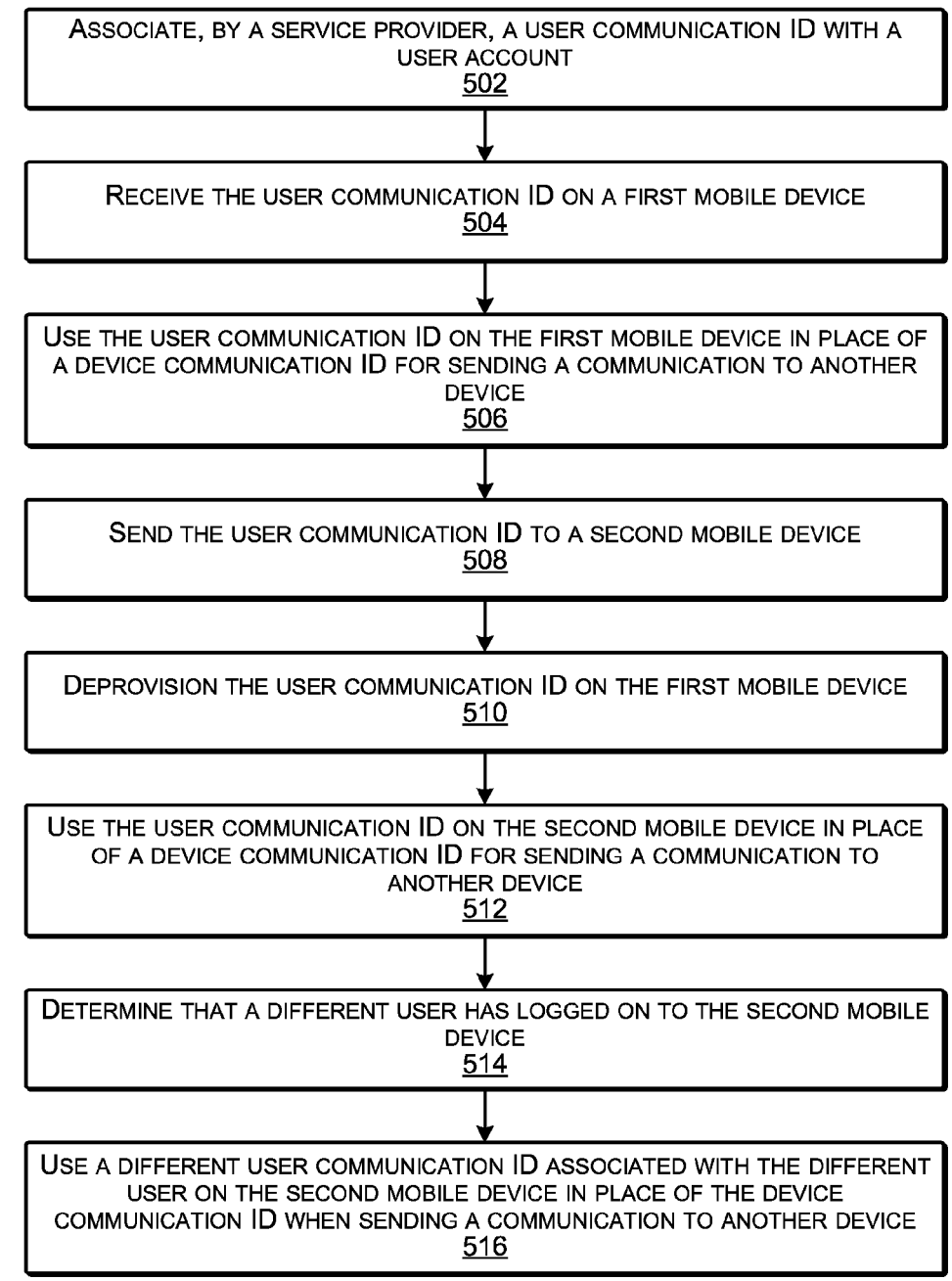
FIG. 5 is a flow diagram illustrating an example process for transferring user information according to some implementations.
Figure 6:
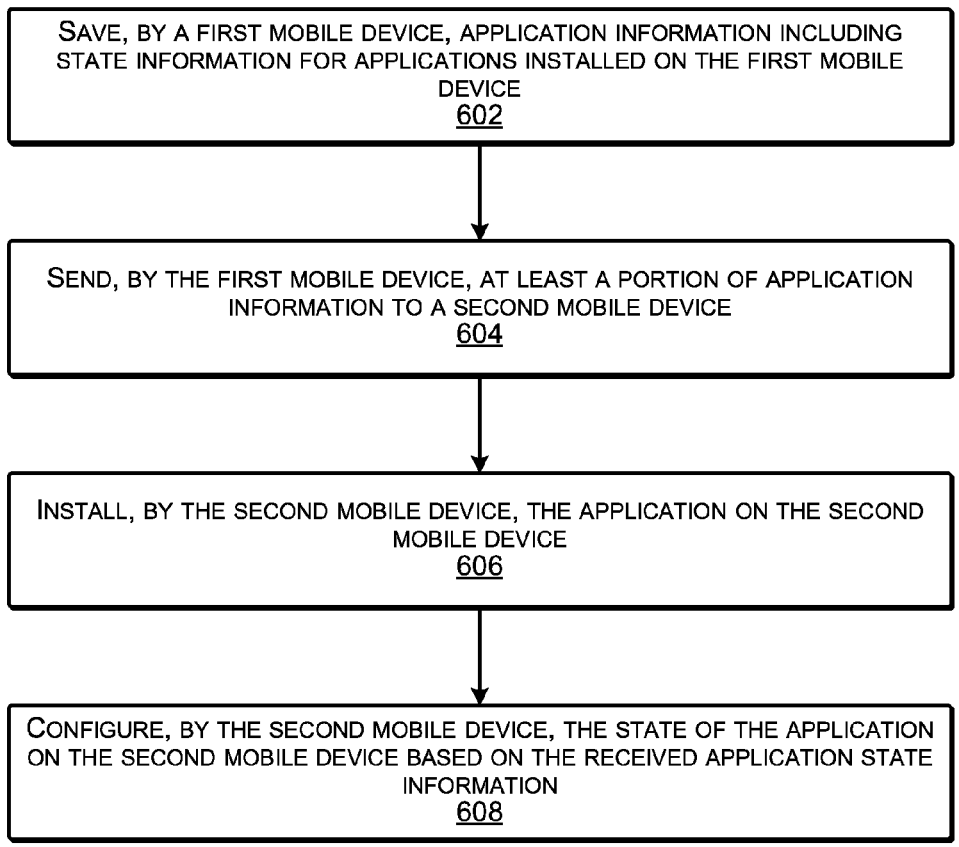
FIG. 6 is a flow diagram illustrating an example process for transferring user information according to some implementations.
Figure 7:
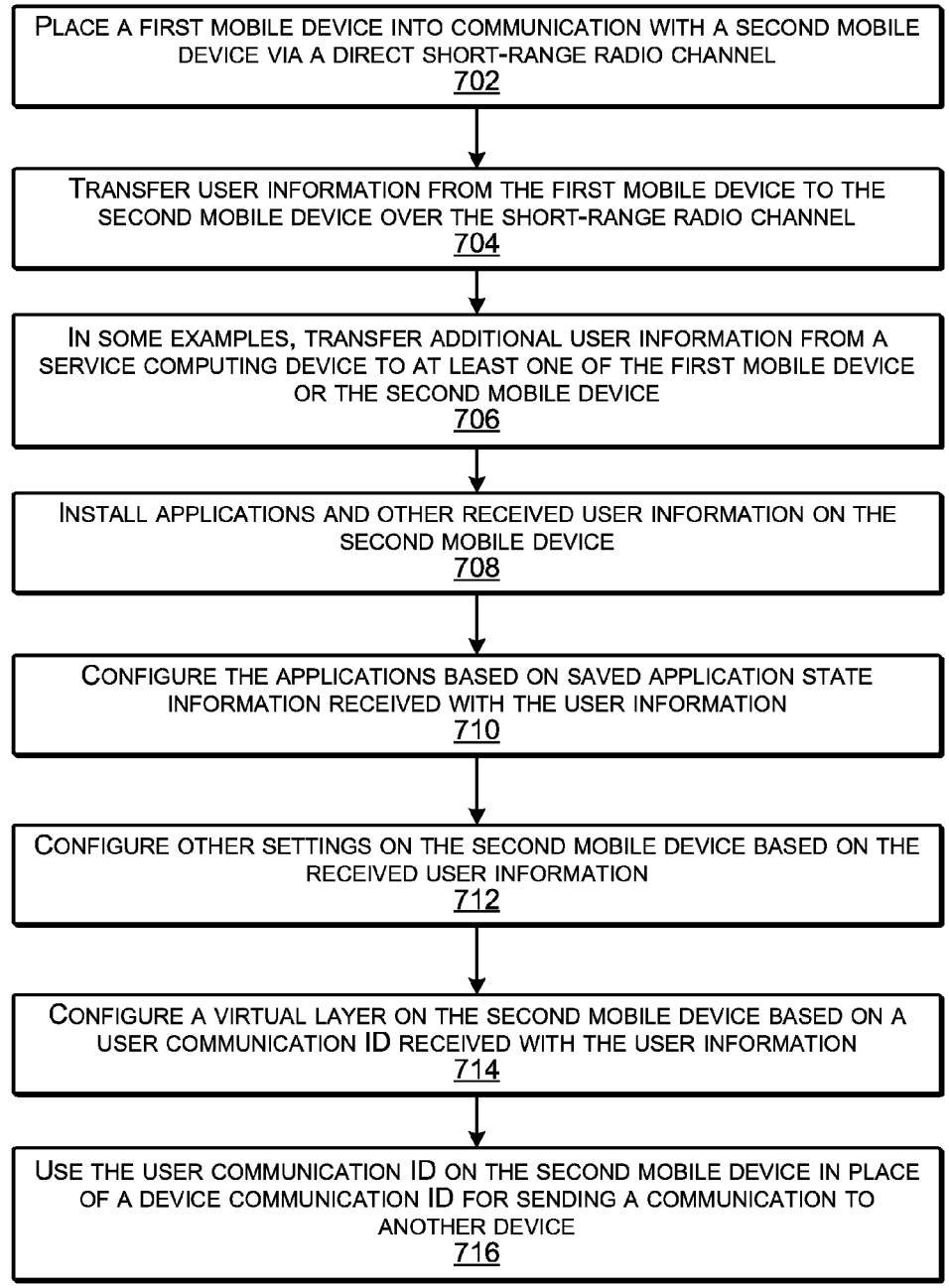
FIG. 7 is a flow diagram illustrating an example process for transferring user information according to some implementations.

FIGS. 5-7 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 5 is a flow diagram illustrating an example process 500 according to some implementations that may be executed by one or more mobile devices 102 for transferring information to enable use of a virtual user communication ID in place of a device communication ID for communicating with other devices.

At 502, a service provider may associate a user communication ID with a user account of a user of a first mobile device. For example, the service provider may obtain a block of user communication IDs from IEEE, such as MAC addresses or BLUETOOTH® addresses, and may assign these IDs to user accounts, rather than to physical communication interface devices. Thus, the user communication IDs may move from mobile device to mobile device with the user account, rather than remaining tied to any one device.

At 504, the first mobile device may receive the user communication ID from a service computing device associated with the service provider. For example, the first mobile device may be associated with the account of the user.

At 506, the first mobile device may use the user communication ID on the first mobile device in place of a device communication ID when sending a communication to another device. For instance, a virtual layer may be established on the first mobile device to use the user communication ID in place of a device communication ID associated with a communication interface device on the first mobile device.

At 508, the first mobile device may send the user communication ID to a second mobile device. For example, the first mobile device may transfer user information to a second mobile device, such as in the case that the second mobile device will be replacing the first mobile device.

At 510, the first mobile device may deprovision the user communication ID on the first mobile device. For example, after the user information has been transferred to the second mobile device, the first mobile device may stop using the user communication ID.

At 512, the second mobile device may use the user communication ID on the second mobile device in place of a device communication ID for sending a communication to another device.

At 514, the second mobile device may determine that a different user has logged on to the second mobile device. For example, multiple user accounts may be set up on the second mobile device to enable multiple different users to log in to the second mobile device.

At 516, the second mobile device may use a different user communication ID associated with the different user on the second mobile device in place of the device communication ID when sending a communication to another device. For example, the second mobile device may have already received the different user communication ID(s) when setting up a second user account on the second mobile device, and may use the user communication ID associated with the second user when the second user is logged in.

FIG. 6 is a flow diagram illustrating an example process 600 according to some implementations that may be executed by mobile devices 102 for transferring information.

At 602, a first mobile device may save application information including state information for applications installed on the first mobile device. For example, each time an application is used on the first mobile device, state information for the application may be saved. The state information may include at least one of: a value for a variable used by the application on the first mobile device; a value saved for an application setting set on the first mobile device; a graphic user interface configuration saved on the first mobile device; or a value for a user input received on the first mobile device. In some examples, the saved state information may be sent over a network for storage at a service computing device.

At 604, the first mobile device may send at least a portion of application information to a second mobile device. For example, in some cases the first mobile device may send the saved state information to the second mobile device, while in other cases, the service computing device may send the saved state information to the second mobile device. Additionally, in some cases the first mobile device or the service computing device may send an application installation file for the application to the second mobile device. For example, the application installation file may have been saved by the service computing device based on the application being installed on the first mobile device.

At 606, the second mobile device may install the application on the second mobile device. For instance, the second mobile device may receive the application installation file from one of the first mobile device or the service computing device.

At 608, the second mobile device may configure the state of the application on the second mobile device based on the application state information received from the first mobile device or the service computing device.

FIG. 7 is a flow diagram illustrating an example process 700 according to some implementations that may be executed by a mobile device 102.

At 702, a first mobile device may be placed into communication with at least a second mobile device via a direct short-range radio channel, such as via a BLUETOOTH® pairing between the first mobile device and the second mobile device.

At 704, the first mobile device may transfer user information from the first mobile device to the second mobile device over the short-range radio channel.

At 706, in some examples, additional user information may be transferred from a service computing device to at least one of the first mobile device or the second mobile device. For instance, the additional user information may be transferred directly to the second mobile device from the service computing device, or may be transferred to the first mobile device, which then transfers the additional user information to the second mobile device.

At 708, the second mobile device may install applications and other received user information on the second mobile device. In some examples, the second mobile device may receive application installation files from the first mobile device or the service computing device.

At 710, the second mobile device may configure the applications based on saved application state information received with the user information.

At 712, the second mobile device may configure other settings on the second mobile device based on the received user information.

At 714, the second mobile device may configure a virtual layer on the second mobile device based on at least one user communication ID received with the user information.

At 716, the second mobile device may use the user communication ID on the second mobile device in place of a device communication ID for sending a communication to another device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
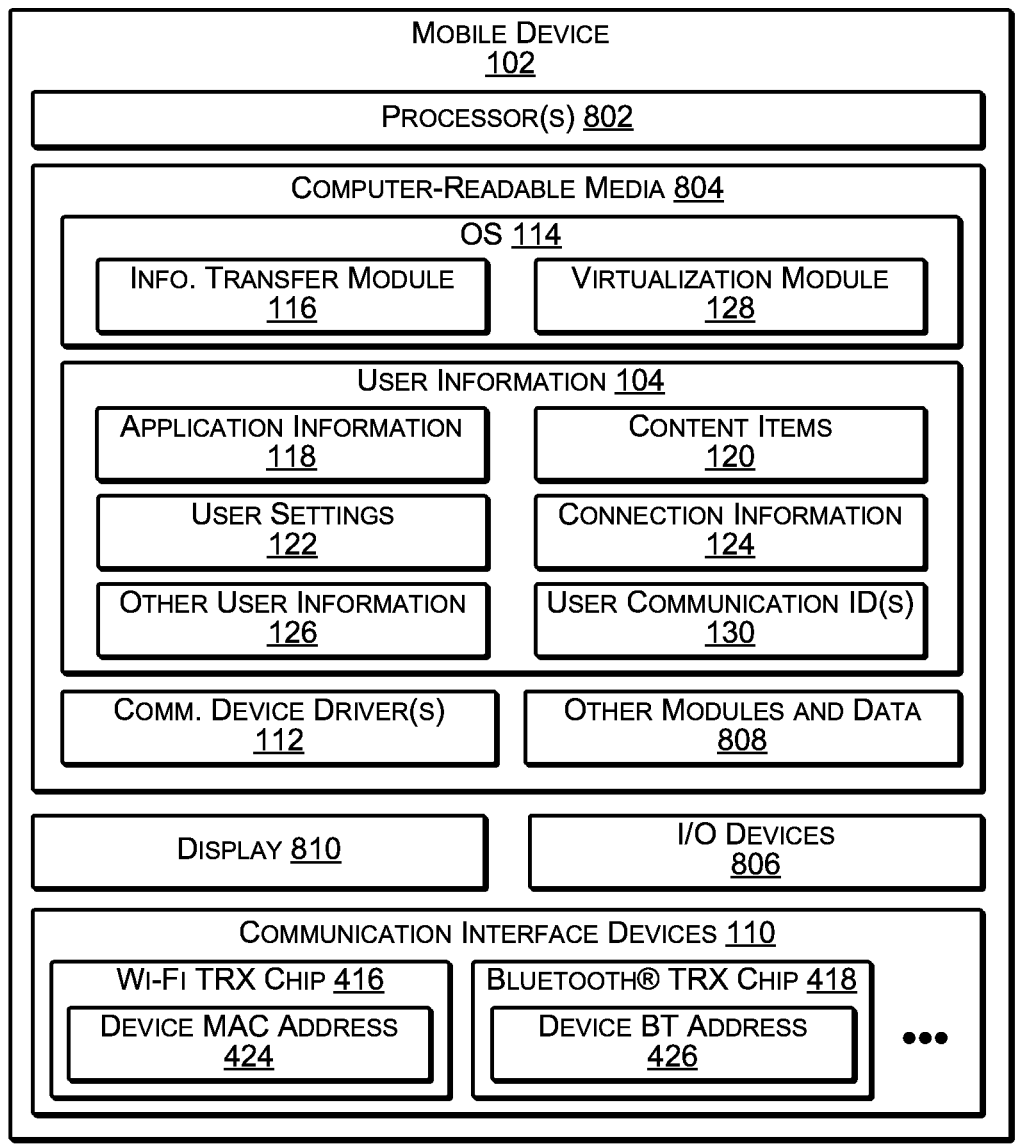
FIG. 8 illustrates select components of an example mobile device according to some implementations.

FIG. 8 illustrates select example components of the mobile device 102 that may implement the functionality described above according to some examples. The mobile device 102 may be any of a number of different types of computing devices, such as a smart phone, cellular phone, tablet computing device, wearable computing device, or the like, as enumerated above. In the example of FIG. 8, the mobile device 102 includes a plurality of components, such as at least one processor 802, one or more computer-readable media 804, the one or more communication interface devices 110, and one or more input/output (I/O) devices 806.

Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable processor-executable instructions stored in the computer-readable media 804.

Depending on the configuration of the mobile device 102, the computer-readable media 804 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 804 may include, but is not limited to, RAM, ROM, EEPROM, flash memory, solid-state storage, magnetic disk storage, optical storage, and/or other computer-readable media technology. Further, in some cases, the mobile device 102 may access external storage, such as RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, modules, or components that may be executed by the processor 802. Further, when mentioned herein, non-transitory computer-readable media exclude media such as energy, carrier signals, electromagnetic waves, and signals per se.

The computer-readable media 804 may be used to store and maintain any number of functional components that are executable by the processor 802. In some implementations, these functional components comprise instructions or programs that are executable by the processor 802 and that, when executed, implement operational logic for performing the actions and services attributed above to the mobile device 102. Functional components of the mobile device 102 stored in the computer-readable media 804 may include the information transfer module 116 and the virtualization module 128. These modules may be included in the OS 114, or may be separate therefrom. The functional components may further include the communication device drivers 112. Additional functional components may include the OS 114 for controlling and managing various functions of the mobile device 102 and for enabling basic user interactions with the mobile device 102.

In addition, the computer-readable media 804 may also store data, data structures and the like, that are used by the functional components. Data stored by the computer readable media 804 may include the user information 104, including the application information 118, the content items 120, the user settings 122, the connection information 124, the other user information 126, and the user communication IDs 130. Depending on the type of the mobile device 102, the computer-readable media 804 may also store other functional components and data, such as other modules and data 808, which may include applications, programs, drivers, etc., and other data used or generated by the functional components. Further, the mobile device 102 may include many other logical, programmatic and physical components, of which those described are merely examples that are related to the discussion herein.

The communication interface devices 110 may include one or more interfaces and/or hardware components for enabling communication with various other devices, such as over the network(s) 206 or directly. For example, communication interface devices 110 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein. Thus, the communication interface devices 110 may include the Wi-Fi transceiver chip 416 and the BLUETOOTH® transceiver chip 418 discussed above, as well as other types of communication interface devices.

FIG. 8 further illustrates that the mobile device 102 may include a display 810. Depending on the type of the mobile device 102, the display 810 may employ any suitable display technology. In some examples, the display 810 may have a touch sensor (not shown) associated with the display 810 to provide a touchscreen display configured to receive touch inputs for enabling interaction with a GUI presented on the display 810. Accordingly, implementations herein are not limited to any particular display technology. Alternatively, in some examples, the mobile device 102 may not include a display.

The mobile device 102 may further include one or more other I/O devices 806. The I/O devices 806 may include speakers, a camera, sensors, and various user controls (e.g., buttons, a joystick, a keyboard, a keypad, etc.), a haptic output device, and so forth. Additionally, the mobile device 102 may include various other components that are not shown, examples of which may include removable storage, a power source, such as a battery and power control unit, and so forth.

Figure 9:
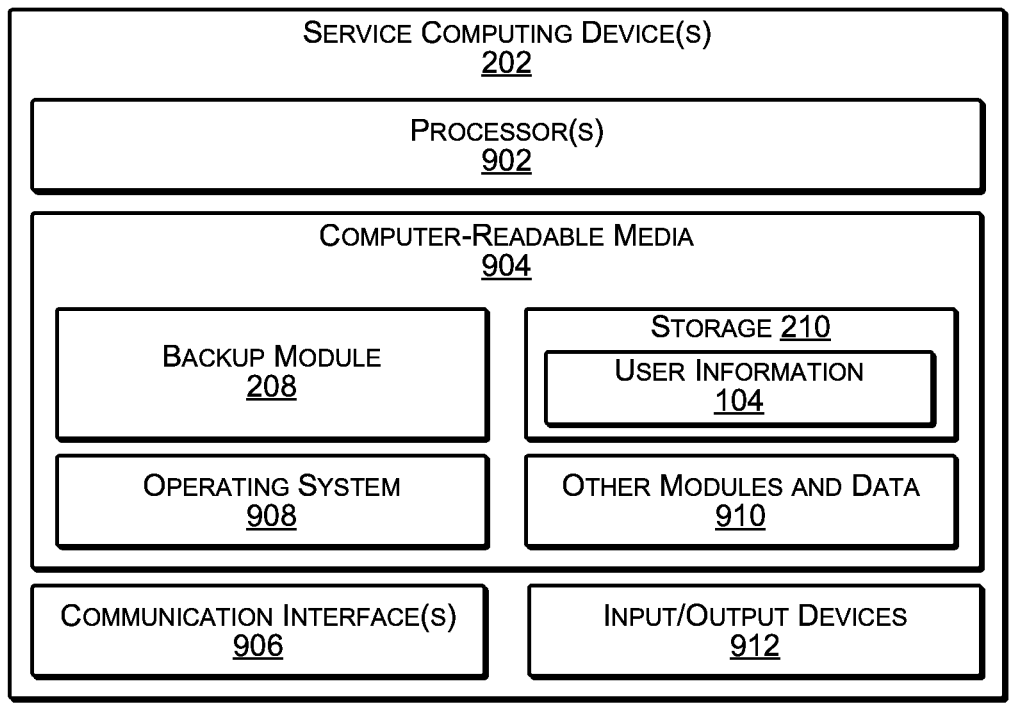
FIG. 9 illustrates select components of an example service computing device according to some implementations.

FIG. 9 illustrates select components of the service computing device 202 according to some implementations. The service computing device 202 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 202 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, each service computing device 202 may include one or more processors 902, one or more computer-readable media 904, and one or more communication interfaces 906. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, state machines, logic circuitries, and/or any devices that manipulate signals based on operational instructions. For instance, the processor(s) 902 may be one or more hardware processors and/or logic circuits of any suitable type specifically programmed or configured to execute the algorithms and processes described herein. The processor(s) 902 can be configured to fetch and execute computer-readable instructions stored in the computer-readable media 904, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 202, the computer-readable media 904 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 904 may be used to store any number of functional components that are executable by the processors 902. In many implementations, these functional components comprise instructions or programs that are executable by the processors 902 and that, when executed, specifically configure the one or more processors 902 to perform the actions attributed above to the service computing device 202. Functional components stored in the computer-readable media 904 may include the backup module 208. Additional functional components stored in the computer-readable media 904 may include an operating system 908 for controlling and managing various functions of the service computing device 202.

In addition, the computer-readable media 904 may store data used for performing the operations described herein. Thus, the computer-readable media 904 may include the storage 210 for storing the user information 104 backed up or otherwise transferred to the service computing device 202. The service computing device 202 may also include or maintain other functional components and data not specifically shown in FIG. 9, such as other modules and data 910, which may include programs, drivers, etc., and the data used or generated by the functional components. Further, the service computing device 202 may include many other logical, programmatic and physical components, of which those described above are merely examples that are related to the discussion herein.

The communication interface(s) 906 may include one or more interfaces and hardware components for enabling communication with various other devices, such as over the network(s) 206. For example, communication interface(s) 906 may enable communication through one or more of the Internet, cable networks, cellular networks, wireless networks (e.g., Wi-Fi) and wired networks, as well as other short-range communications, such as BLUETOOTH®, and the like, as additionally enumerated elsewhere herein.

The service computing device 202 may further be equipped with various input/output (I/O) devices 912. Such I/O devices 912 may include a display, various user interface controls (e.g., buttons, joystick, keyboard, mouse, touch screen, etc.), audio speakers, connection ports and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A mobile device comprising:
 a communication interface device; and
 one or more processors, coupled to the communication interface device and configured to:
  send a user information comprising a user communication identifier (ID) to a second mobile device, the user communication ID being used in place of a device communication ID associated with the communication interface device for a short-range radio communication sent via the communication interface device;

receive an indication that the user information has been received by the second mobile device; and
cease using the user communication ID on the mobile device based at least in part on the received indication.

2. The mobile device as recited in claim 1, wherein:
the communication interface device is a short-range radio transceiver and the device communication ID is an individually distinguishable address associated with the short-range radio transceiver; and
the user communication ID is associated with a user account associated with the mobile device.

3. The mobile device as recited in claim 1, wherein the one or more processors are further configured to associate the user communication ID with at least one of a kernel of an operating system of the mobile device or a driver of the communication interface device, wherein the at least one of the kernel or the driver causes, at least in part, the user communication ID to be used in place of the device communication ID for the short-range radio communication.

4. The mobile device as recited in claim 1, wherein the one or more processors are further configured to:
pair the mobile device with a third mobile device for communication via the communication interface device using the device communication ID;
receive, from the third mobile device, via the communication interface device, the user information comprising the user communication ID; and
following receipt of the user information, use the user communication ID in place of the device communication ID for the short-range radio communication sent via the communication interface device.

5. The mobile device as recited in claim 1, wherein the one or more processors are further configured to:
receive, with the user information, application information including application state information for an application;
install the application on the mobile device; and
configure a state of the application on the mobile device based on the received application state information.

6. The mobile device as recited in claim 1, wherein:
the user information is associated with a third mobile device; and
the one or more processors are further configured to receive the user information from at least one of:
the third mobile device via a wired connection or a direct short-range radio connection; or
a service computing device to which the third mobile device has sent at least a portion of the user information.

7. The mobile device as recited in claim 1, wherein the one or more processors are further configured to:
determine that a different user has logged on to the mobile device; and
use a different user communication ID associated with the different user for sending a communication via the communication interface device.

8. A system able to communicate with a first mobile device, the system comprising a second mobile device including at least one processor programmed by executable instructions to perform operations comprising:
receiving, by the second mobile device, from the first mobile device, a user information comprising a user communication identifier (ID) to be used in place of a device communication ID associated with a communication interface device on the second device, wherein the user communication ID was previously used by the first mobile device to communicate via short-range radio;
sending a communication, via the communication interface device, the communication including the user communication ID in place of the device communication ID; and
following receipt of the user communication ID, sending an indication to the first mobile device that receipt of user information is complete, the indication causing, at least in part, the first mobile device to cease using the user communication ID for sending communications.

9. The system as recited in claim 8, wherein:
receiving the user information further comprises receiving link information for a shared secret between the first mobile device and a third device; and
sending the communication further comprises sending the link information to the third device with the communication.

10. The system as recited in claim 8, the operations further comprising:
prior to receiving the user communication ID, pairing the second mobile device with the first mobile device for communication via the communication interface device using the device communication ID; and
following receipt of the user communication ID from the first mobile device, using the user communication ID in place of the device communication ID for the communication sent via the communication interface device.

11. The system as recited in claim 8, the operations further comprising:
receiving, from the first mobile device, at least a portion of application information for an application and application state information saved by the first mobile device;
installing the application on the second mobile device; and
configuring the application on the second mobile device based at least in part on the application state information saved by the first mobile device.

12. The system as recited in claim 11, the operations further comprising receiving at least another portion of the application information over a network from a service computing device.

13. A method of a first mobile device, the method comprising:
sending a user information comprising a user communication identifier (ID) to a second mobile device, the user communication ID being used in place of a device communication ID associated with the first mobile device for a short-range radio communication sent by the first mobile device;
receiving an indication that the user information has been received by the second mobile device; and
ceasing using the user communication ID on the first mobile device based at least in part on the received indication.

14. The method as recited in claim 13, wherein:
the device communication ID is an individually distinguishable address associated with a short-range radio transceiver of the first mobile device; and
the user communication ID is associated with a user account associated with the first mobile device.

15. The method as recited in claim 13, further comprising:
associating the user communication ID with at least one of a kernel of an operating system of the first mobile device or a driver associated with the first mobile device, wherein the at least one of the kernel or the driver causes, at least in part, the user communication ID to be used in place of the device communication ID for the short-range radio communication.

16. The method as recited in claim 13, further comprising:
pairing the first mobile device with a third mobile device for communication using the device communication ID;
receiving, from the third mobile device, the user information comprising the user communication ID; and
following receipt of the user information, using the user communication ID in place of the device communication ID for the short-range radio communication.

17. The method as recited in claim 13, further comprising:
receiving, with the user information, application information including application state information for an application;
installing the application on the mobile device; and
configuring a state of the application on the mobile device based on the received application state information.

18. The method as recited in claim 13, wherein:
the user information is associated with a third mobile device; and
the method further comprises receiving the user information from at least one of:
the third mobile device via a wired connection or a direct short-range radio connection; or
a service computing device to which the third mobile device has sent at least a portion of the user information.

19. The method as recited in claim 13, further comprising:
determining that a different user has logged on to the first mobile device; and
using a different user communication ID associated with the different user for sending a communication.

* * * * *